H. B. DYER.
Joint for Sidewalks.

No. 201,171.  Patented March 12, 1878.

Witnesses:

Inventor:
Henry B. Dyer
by Ridout and Co
Att'ys

UNITED STATES PATENT OFFICE.

HENRY B. DYER, OF TORONTO, ONTARIO, CANADA.

IMPROVEMENT IN JOINTS FOR SIDEWALKS.

Specification forming part of Letters Patent No. 201,171, dated March 12, 1878; application filed January 7, 1878.

*To all whom it may concern:*

Be it known that I, HENRY BROWN DYER, of the city of Toronto, in the county of York and Province of Ontario, Canada, have invented a certain new and useful Improvement in Joints for Sidewalks, which improvement is fully set forth in the following specification, reference being had to the accompanying draw g.

The principal object of the invention is to construct a sidewalk in which the boards comprising it are so connected as to form a continuous sheet or plank; and consists in a peculiarly-formed block placed between the planks and secured to the sleepers by screws, the said blocks being so shaped and placed that they form a rigid joint between the planks they secure.

Figure 1:
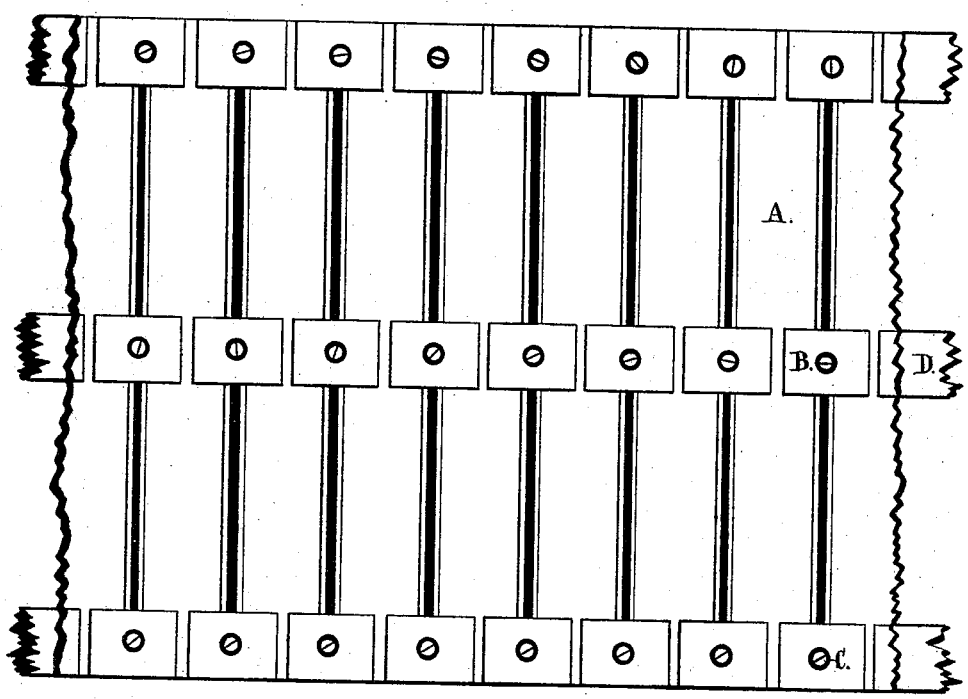
Figure 2:
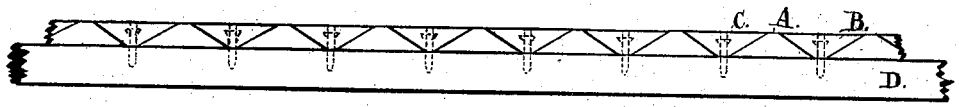

In the accompanying drawing, Figure 1 is a plan of my improved sidewalk. Fig. 2 is a longitudinal section.

D are the sleepers, laid in the ordinary way. A are the planks, placed as usual, but having beveled notches cut in them immediately over the sleepers. Into these notches the beveled blocks B fit, and, being fastened to the sleepers by the screws C, securely hold the boards A in position, as shown.

The peculiar form of the blocks B, fitting into corresponding notches in the planks or boards A, prevents the boards moving independently of each other so long as the said blocks B are held by screws or otherwise to the sleepers.

While I believe that screws C sunk below the surface of the board A will be found most serviceable, I do not confine myself to their use or to any peculiar shape thereof.

I may also state that leaving an open space between the boards makes them last much longer, and is, of course, the means of a considerable saving in laying any long distance of walk. This open work is, however, not necessary in order to utilize my joint, as the block and screw forming it are equally applicable to boards or planks fitting close together, whether used in sidewalks, ships' decks, or for other purposes.

In laying planking I would advise that the joint be painted with tar, pitch, or some other suitable material for preserving the wood.

In the drawing I have shown three blocks, B, for holding each board A; but it, of course, may be necessary to use less or more blocks.

I do not claim, broadly, the screwing of boards together in a continuous sheet; but

What I claim as my invention is—

The beveled blocks B, fitting into correspondingly-shaped notches cut in the planks A, and secured to the sleepers D by the screws C, or their equivalent, substantially as shown and described, for the purpose of binding the planks A together, and at the same time holding them to the sleepers D.

HENRY B. DYER.

Witnesses:
L. WHITEHEAD,
DONALD C. RIDOUT.